(12) United States Patent
Chen et al.

(10) Patent No.: US 8,844,022 B2
(45) Date of Patent: Sep. 23, 2014

(54) METHOD AND SYSTEM TO ALLOW SYSTEM-ON-CHIP INDIVIDUAL I/O CONTROL TO BE DISABLED AND ENABLED BY PROGRAMMABLE NON-VOLATILE MEMORY

(75) Inventors: Iue-Shuenn Chen, San Diego, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 11/558,328

(22) Filed: Nov. 9, 2006

(65) Prior Publication Data
US 2007/0294761 A1 Dec. 20, 2007

Related U.S. Application Data

(60) Provisional application No. 60/814,814, filed on Jun. 19, 2006.

(51) Int. Cl.
| | |
|---|---|
| *G06F 7/04* | (2006.01) |
| *G06F 12/14* | (2006.01) |
| *G06F 21/85* | (2013.01) |
| *H04N 21/426* | (2011.01) |
| *H04N 21/443* | (2011.01) |
| *H04N 21/462* | (2011.01) |
| *H04N 21/475* | (2011.01) |
| *G06F 21/31* | (2013.01) |

(52) U.S. Cl.
CPC ............... *G06F 21/85* (2013.01); *G06F 21/31* (2013.01); *H04N 21/42623* (2013.01); *H04N 21/42684* (2013.01); *H04N 21/443* (2013.01); *H04N 21/462* (2013.01); *H04N 21/4753* (2013.01)
USPC ................... 726/18; 726/5; 726/27; 713/168; 713/182

(58) Field of Classification Search
None
See application file for complete search history.

(56) References Cited

U.S. PATENT DOCUMENTS

| | | | | |
|---|---|---|---|---|
| 5,875,248 | A * | 2/1999 | Lewis | 713/168 |
| 6,507,612 | B1 * | 1/2003 | Fujimaki | 375/224 |
| 2006/0005253 | A1 * | 1/2006 | Goldshlag et al. | 726/26 |
| 2006/0156033 | A1 * | 7/2006 | Desmicht et al. | 713/193 |
| 2008/0086641 | A1 * | 4/2008 | Rodgers et al. | 713/176 |

* cited by examiner

*Primary Examiner* — Kaveh Abrishamkar
(74) *Attorney, Agent, or Firm* — Sterne, Kessler, Goldstein & Fox P.L.L.C.

(57) ABSTRACT

Certain aspects of a method and system for allowing system-on-chip individual I/O control to be disabled and enabled by programmable non-volatile memory are disclosed. Aspects of one method may include mapping at least one bit of a control vector within a security processor comprising a non-volatile memory to each of a plurality of on-chip I/O physical buses. At least one of the plurality of on-chip I/O physical buses may be enabled or disabled by modifying the mapped bit or bits of the control vector.

30 Claims, 5 Drawing Sheets

METHOD AND SYSTEM TO ALLOW SYSTEM-ON-CHIP INDIVIDUAL I/O CONTROL TO BE DISABLED AND ENABLED BY PROGRAMMABLE NON-VOLATILE MEMORY

CROSS-REFERENCE TO RELATED APPLICATIONS/INCORPORATION BY REFERENCE

This patent application makes reference to, claims priority to and claims benefit from U.S. Provisional Patent Application Ser. No. 60/814,834, filed on Jun. 19, 2006.

This application makes reference to:
U.S. patent application Ser. No. 11/135,906 filed on May 24, 2005; and
U.S. patent application Ser. No. 11/558,360 filed on Nov. 9, 2006.

Each of the above stated applications is hereby incorporated herein by reference in its entirety.

FIELD OF THE INVENTION

Certain embodiments of the invention relate to secure communication systems. More specifically, certain embodiments of the invention relate to a method and system for allowing system-on-chip individual input/output (I/O) control to be disabled and enabled by programmable non-volatile memory.

BACKGROUND OF THE INVENTION

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing or restricting at least some limited functionality of the system. In some instances, a single device, such as a security processor for example, may be utilized to administer security operations in the multimedia system. The security processor may operate independently of other components in the multimedia system when determining rights or privileges of different users to various features in the multimedia system. For example, vendors may have limited access to some of the functions that may be accessible by the manufacturer. Home users may only have access to a subset of the vendors' access rights. In some instances, secure operations may be managed by specifying, in a single location, secure conditions for each security component supported by the system.

Test modes for modern set-top boxes (STBs) may be protected by a plurality of secure authentication mechanisms. Authentication mechanisms in a STB may be required to authenticate a single user or multiple users. In STB applications such as accessing system buses and interfaces, a user may need to provide specific information to enable the system to confirm its identity. The information may be in the form of passwords or responses by the user to the STB challenges.

One of the common approaches to authenticating a user identity is the use of passwords. For example, the user may provide a password, and the STB may validate the password. If the password is associated with the user, that user's identity may be authenticated. If the password is not associated with the user, the password may be rejected and the authentication may fail.

A common hidden unreadable value may be stored in a chip to generate the password. A secure passing algorithm, for example, an algorithm modified from advanced encryption standard (AES) may be enabled to protect the password from an attacker trying to guess it. The password scheme may be used for preventing unauthorized users to access security sensitive areas of a device, for example, observing and controlling test access ports (TAPs) on a software controlled basis. One of the problems associated with passwords are that they are reusable. If an attacker breaks a password, he may later reuse the password to gain access to other STBs. A set-top box (STB) may not be able to distinguish between an attacker and a legitimate user.

On a typical security system, the number of user modes and security components may be sufficiently large that the size of the security management and/or control information may require large amounts of memory. There may be a significant number of access control entries that may correspond to instances when access rights may not be granted and/or instances when the access rights may be the same for multiple user modes and/or for multiple security components, such as default settings, for example. The addition or removal of user modes or security components may pose various implementation challenges, which may increase hardware and/or software complexity. As software and/or hardware complexity increases, it may become more challenging to manage security operations without introducing security breaches or other concerns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for allowing system-on-chip individual I/O control to be disabled and enabled by programmable non-volatile memory, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for allowing system-on-chip individual input/output (I/O) control to be disabled and enabled by programmable non-volatile memory. Certain aspects of the invention may comprise mapping at least one bit of a control vector within a security processor comprising a non-volatile memory to each of a plurality of on-chip I/O physical buses. At least one of the plurality of on-chip I/O physical buses may be enabled or disabled by modifying the mapped bit or bits of the control vector.

Figure 1A:
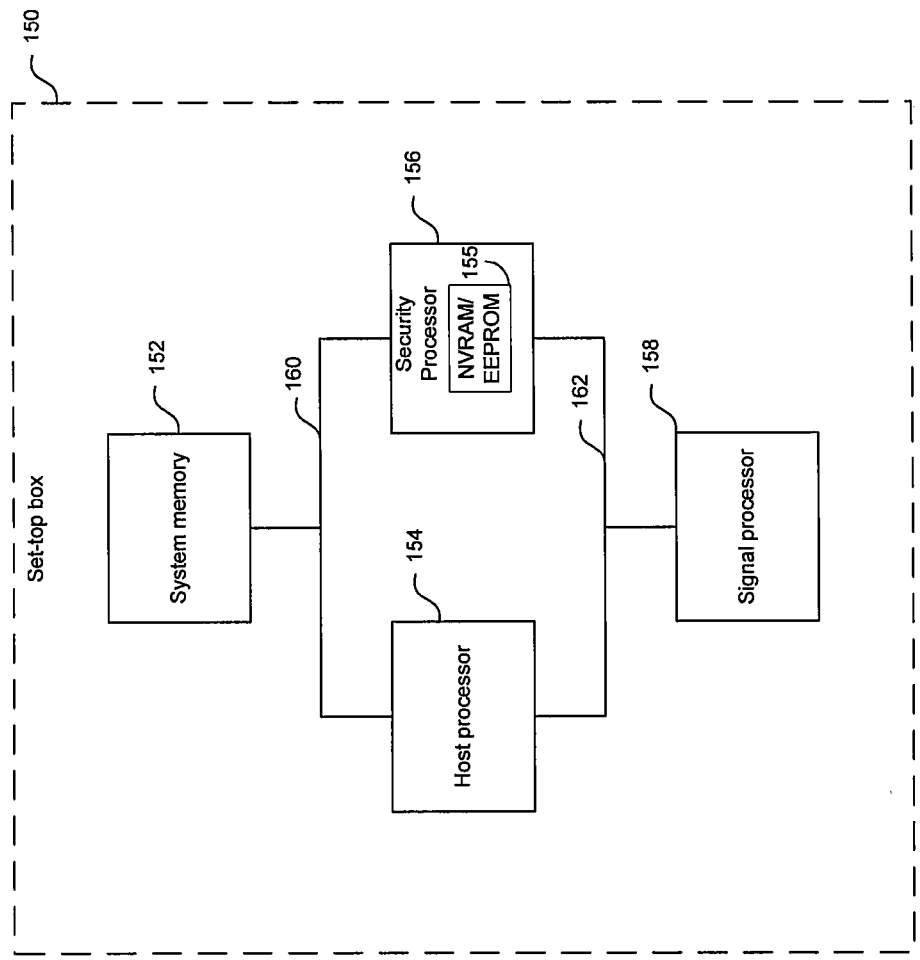
FIG. 1A is a block diagram illustrating an exemplary set-top box with a security processor, in accordance with an embodiment of the invention.

FIG. 1A is a block diagram illustrating an exemplary set-top box with a security processor, in accordance with an embodiment of the invention. Referring to FIG. 1A, there is shown a set-top box 150 that may comprise a host processor 154, a system memory 152, a security processor 156, a signal processor 158, a memory bus 160, and a data bus 162. The host processor 154 may comprise suitable logic, circuitry, and/or code that may be enabled to perform data processing and/or system control operations associated with the set-top box 150. The host processor 154 may be enabled to communicate with the system memory 152 via, for example, the memory bus 160 and with the security processor 156 and/or the signal processor 158 via, for example, the data bus 162. The system memory 152 may comprise suitable logic, circuitry, and/or code that may be enabled to store data, control information, and/or operational information. The security processor 156 may comprise suitable logic, circuitry, and/or code that may be enabled to perform multiple security operations on data received by the set-top box 150. The security operations may include, but need not be limited to, non-volatile memory (NVM) security, "key ladders," which may be designed for cryptographically wrapping/unwrapping keys, challenge-response authentication, memory data signature verification, secure scrambler configuration, and security assurance logic, for example. In this regard, the security processor 156 may comprise multiple security components to perform the features associated with the security operations. The signal processor 158 may comprise suitable logic, circuitry, and/or code that may be enabled to perform a plurality of processing operations on the data received by the set-top box 150. The set-top box may utilize at least one signal processor 158.

In operation, the security processor 156 may receive an access request from a user to perform a certain data operation within the set-top box 150. The security processor 156 may verify access rights or privileges that the user may have to a security component in the security processor 156 based on a securely stored access control matrix. The security processor 156 may determine whether access to a security component may be provided independently of the host processor 154, that is, the security processor 156 may not operate as a slave to the host processor 154. When access to the security component is verified, the security processor 156 may perform the security feature or features associated with the security component. In some instances, the security processor 156 may transfer the results of the operations associated with the security component to, for example, the host processor 154 and/or the signal processor 158. Moreover, the security processor 156 may utilize information stored in the system memory 152 when performing certain security operations associated with security features.

Figure 1B:
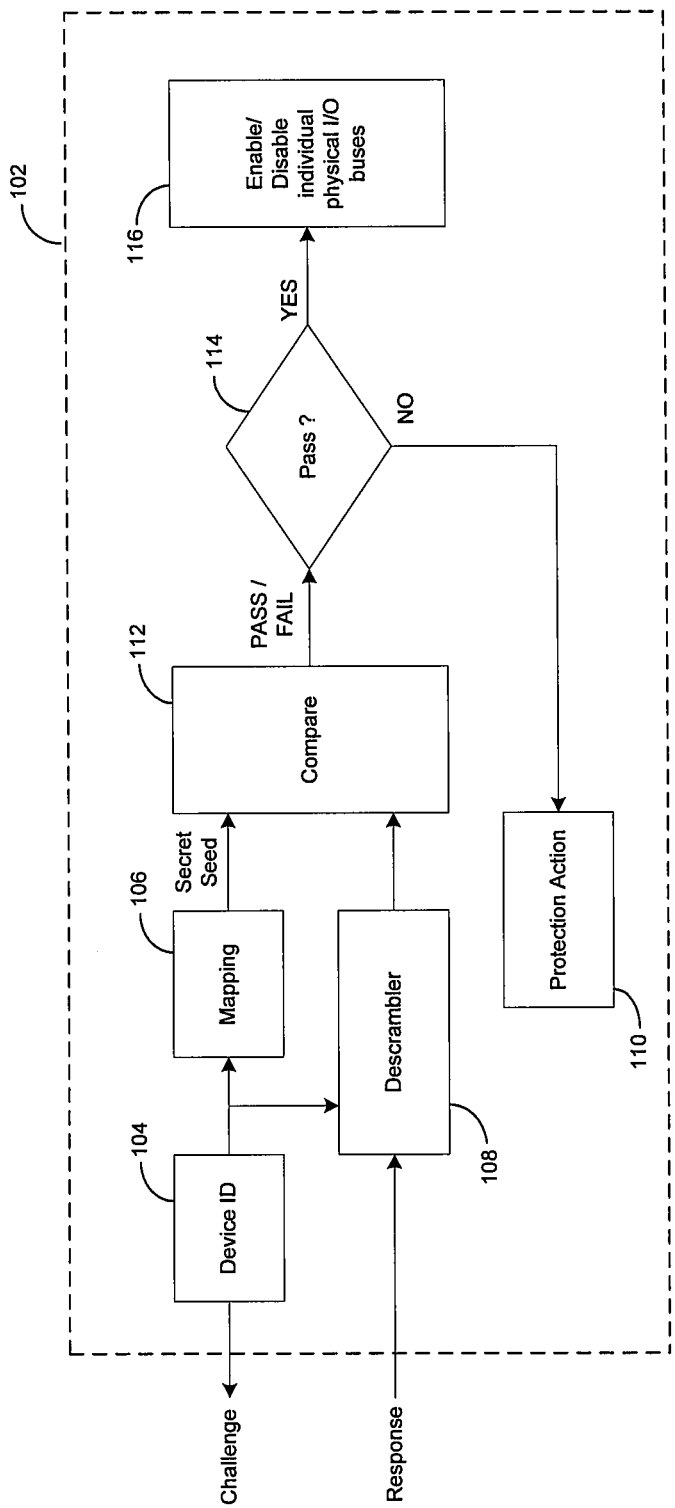
FIG. 1B is a block diagram illustrating an exemplary set-top box (STB) challenge-response process, in accordance with an embodiment of the invention.

FIG. 1B is a block diagram illustrating a set-top box (STB) challenge-response process, in accordance with an embodiment of the invention. Referring to FIG. 1B, there is shown a set-top box (STB) 102. The STB 102 may comprise a device ID block 104, a mapping block 106, a descrambler block 108, a protection action block 110, a compare block 112, a decision block 114 and an enable/disable block 116.

The device ID block 104 may comprise suitable logic, circuitry and/or code that may be enabled to store a unique readable device ID. The mapping block 106 may comprise suitable logic, circuitry and/or code that may be enabled to store a table of values to map the device ID stored in the device ID block 104 and generate a corresponding secret seed. The descrambler block 106 may comprise suitable logic, circuitry and/or code that may be enabled to store a corresponding unique unreadable key to the device ID stored in the device ID block 104. The compare block 114 may comprise suitable logic, circuitry and/or code that may be enabled to compare the device ID stored in the device ID block 104 with its unique key stored in the descrambler block 108. In an alternative embodiment of the invention, the device ID stored in the device ID block 104 may be compared with its unique key stored in the descrambler block 108 by the STB 102. The enable block 116 may comprise suitable logic, circuitry and/or code that may enable at least one of the plurality of physical I/O buses. The protection action block 110 may comprise suitable logic, circuitry and/or code that may be enabled to reject a user from accessing the set-top box 102 if authentication fails.

If the device ID stored in the device ID block 104 matches with its corresponding unique key stored in the descrambler block 108, control passes to the enable block 116. The enable/disable block 116 may be enabled to enable/disable at least one of the plurality of physical I/O buses. If the device ID stored in the device ID block 104 does not match its corresponding unique key stored in the descrambler block 108, authentication may fail and control passes to the protection action block 110. The protection action block 110 may be enabled to reject a user from accessing the set-top box 102 if authentication fails.

The set-top box 102 may be enabled to have an n-bit, for example, 64-bit unique readable device ID and a corresponding unique unreadable key in the descrambler block 108, both of which may be known to an authorizing entity. The unique device ID stored in the device ID block 104 and its corresponding key stored in the descrambler block 108 may be utilized to authenticate the STB 102. In order to keep the key value hidden, only the device ID stored in the device ID block 104 generating the challenge may be readable. The compare block 112 may be enabled to compare the device ID stored in the device ID block 104 with its unique key stored in the descrambler block 108 for a given STB 102, using a table of values stored in the mapping block 106 known only to the authorizing entity to generate a response. The response may be utilized as the unique password for the STB 102 to access security sensitive areas or functions of the device.

Figure 2:
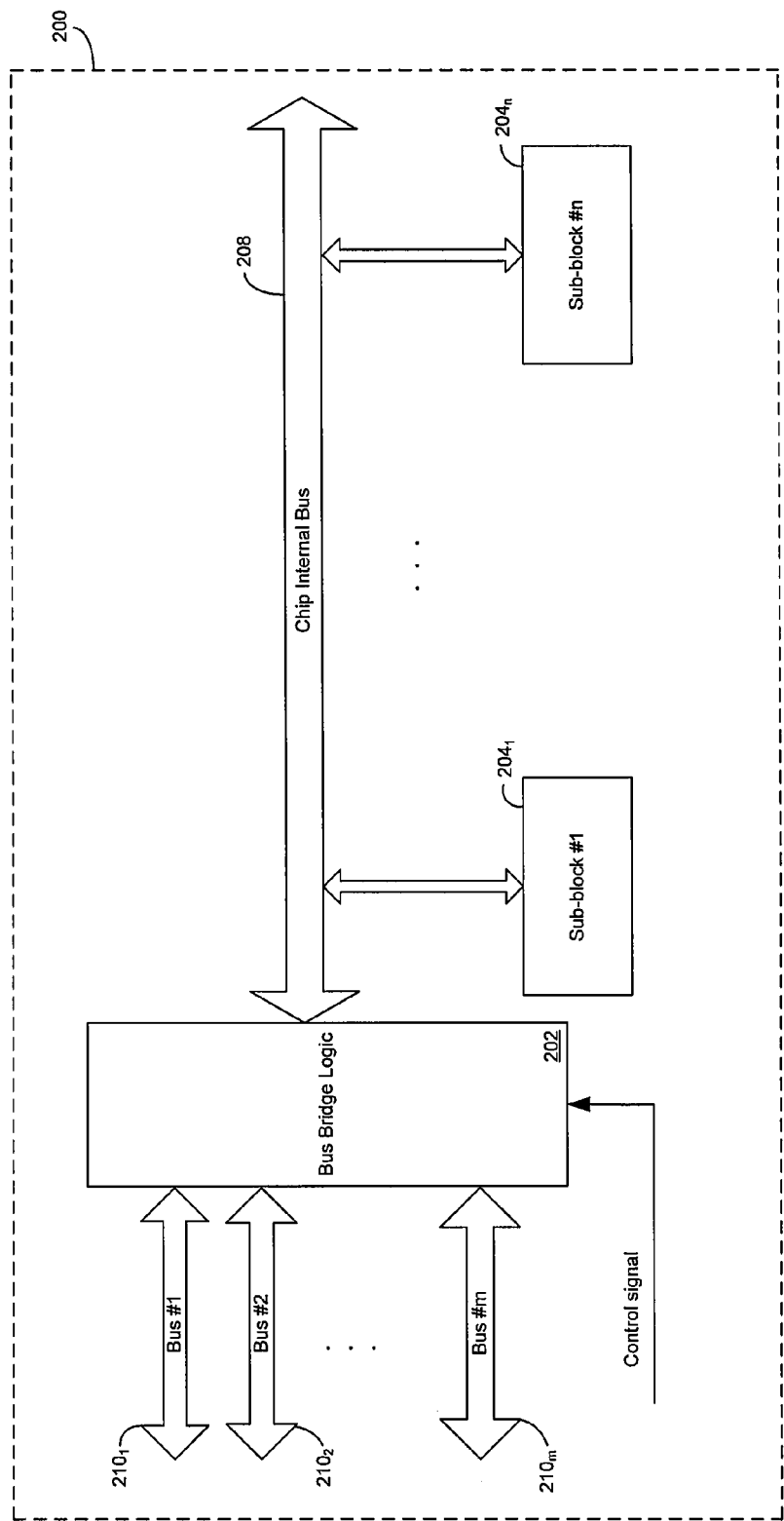
FIG. 2 is a block diagram illustrating a system with global bus control that may be utilized in connection with an embodiment of the invention.

FIG. 2 is a block diagram illustrating a system with global bus control that may be utilized in connection with an embodiment of the invention. Referring to FIG. 2, there is shown a chip 200 that comprises a bus bridge logic block 202, a plurality of physical I/O buses $210_{1 \ldots M}$, an internal bus 208, and a plurality of sub-blocks $204_{1 \ldots n}$.

The plurality of physical I/O buses $210_{1...M}$ may be, for example, joint test action group (JTAG), PCI, or system on chip (SoC) test buses. The JTAG interface may be utilized for testing the plurality of sub-blocks $204_{1...n}$, and as a mechanism for debugging embedded systems. The bus bridge logic block 202 may comprise suitable logic, circuitry and/or code that may enable coupling the plurality of physical I/O buses $210_{1...M}$ to the plurality of sub-blocks $204_{1...n}$. The bus bridge logic block 202 may comprise a cross bar switch, for example, that may enable coupling each of the plurality of physical I/O buses $210_{1...M}$ to a plurality of peripherals, for example, high-speed master peripherals and/or low speed peripherals. The bus bridge logic block 202 may also comprise a matrix switched interconnect. The bus bridge logic block 202 may be programmed to configure any one of the plurality of sub-blocks $204_{1...n}$ by utilizing a control signal.

The internal bus 208 may be either a slave bus or a master bus that may be coupled to the plurality of sub-blocks $204_{1...n}$. One embodiment of the invention may provide a mechanism that addresses individual I/O control of the physical I/O buses via embedded non-volatile memory programming.

Figure 3:
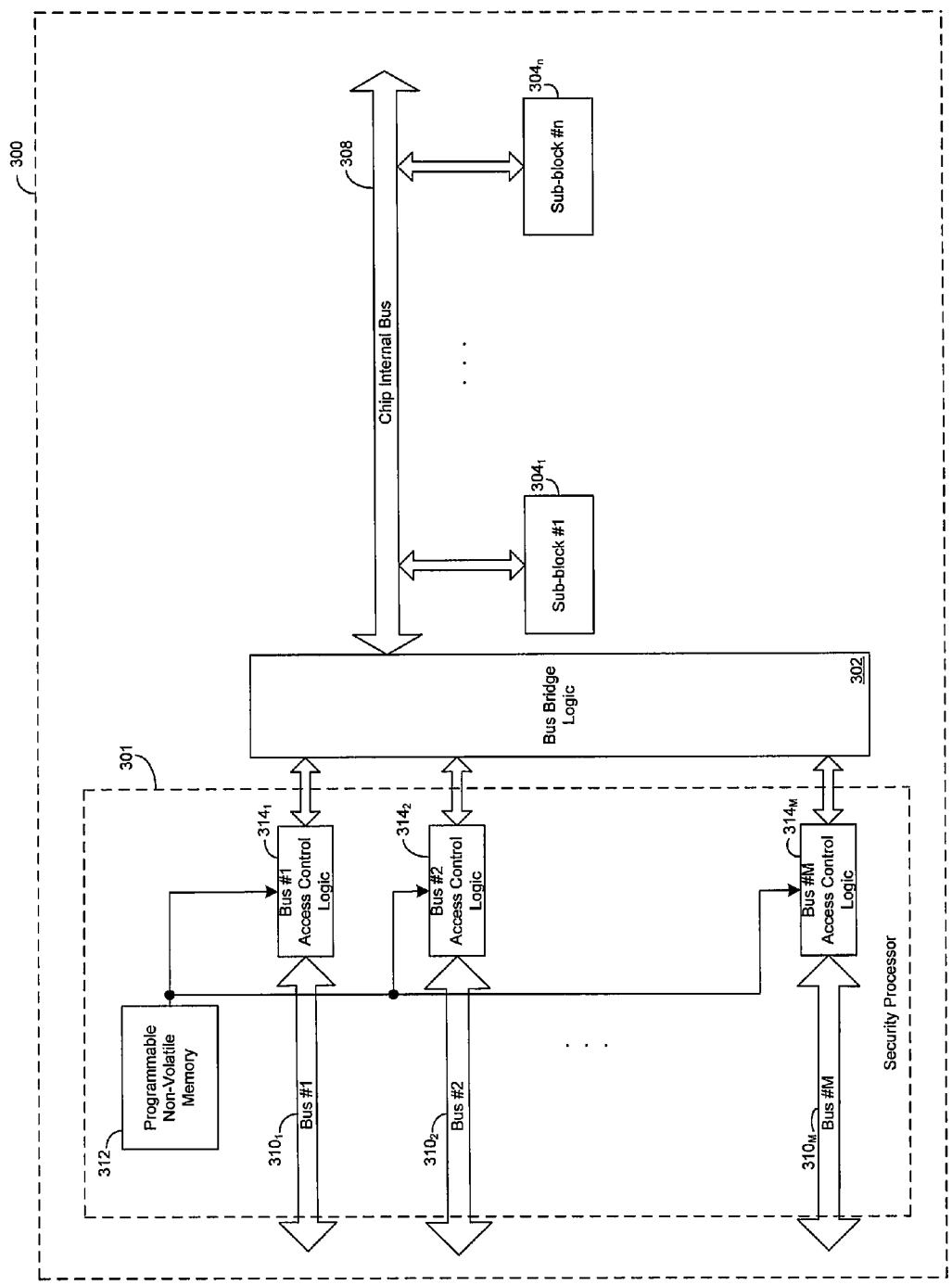
FIG. 3 is a block diagram illustrating exemplary use of programmable non-volatile memory to individually control access to internal chip resources, in accordance with an embodiment of the invention.

FIG. 3 is a block diagram illustrating exemplary use of programmable non-volatile memory to individually control access to internal chip resources, in accordance with an embodiment of the invention. Referring to FIG. 3, there is shown a chip 300. The chip 300 may comprise a security processor 301, a bus bridge logic block 302, an internal bus 308, a plurality of on-chip sub-blocks $304_{1...n}$, a plurality of physical I/O buses $310_{1...M}$. The security processor 301 may comprise a programmable non-volatile memory 312 and a plurality of bus access control logic blocks $314_{1...M}$.

The programmable non-volatile memory 312 may comprise suitable logic, circuitry and/or code that may be enabled to control the internal sub-blocks $304_{1...n}$ of the chip 300 by programming internal control registers and/or observing internal hardware states. The programmable non-volatile memory 312 may be enabled to map at least one bit of a control vector stored in the programmable non-volatile memory 312 to each of a plurality of on-chip I/O physical buses $310_{1...M}$. The control vector may be a n-bit, for example, 64-bit vector within the programmable non-volatile memory 312. Each physical I/O bus $310_{1...M}$ may be mapped to one or more bits of the control vector stored in the programmable non-volatile memory 312. The plurality of physical I/O buses $310_{1...M}$ may be either industry standard buses, such as PCI buses, or proprietary buses that may be unique to a given chip.

The programmable non-volatile memory 312 may be enabled to control at least one of the plurality of on-chip I/O physical buses, for example, $310_{1...M}$ by modifying the mapped at least one bit of the control vector via the plurality of bus access control logic blocks $314_{1...M}$. The programmable non-volatile memory 312 may enable at least one of the plurality of on-chip I/O physical buses, for example, $310_{1...M}$ by modifying the mapped at least one bit of the control vector. The programmable non-volatile memory 312 may disable at least one of the plurality of on-chip I/O physical buses, for example, $310_{1...M}$ by modifying the mapped at least one bit of the control vector. The programmable non-volatile memory 312 may be, for example, a non-volatile RAM 155 within a set-top box 150. The programmable non-volatile memory 312 may be, for example, a secure flash electrically erasable programmable read only memory (EEPROM) 155. The programmable non-volatile memory 312 may be, for example, a one time programmable (OTP) memory.

The bus access control logic blocks $314_{1...M}$ may comprise suitable logic, circuitry and/or code that may be enable to control at least one of the plurality of on-chip I/O physical buses, for example, $310_{1...M}$ based on received instructions from the security processor 301. The programmable non-volatile memory 312 may enable and/or disable each of the plurality of on-chip I/O physical buses, for example, $310_{1...M}$ by modifying the mapped at least one bit of the control vector. The plurality of blocks in FIG. 3 may be substantially as described in FIG. 2.

In another embodiment of the invention, the security processor 301 may enable temporary access to each sub-block $304_{1...n}$ on the chip 300. The programmable non-volatile memory 312 may be enabled to further divide program control between the plurality of on-chip I/O physical buses, for example, $310_{1...M}$ based on determining whether each of the plurality of on-chip I/O physical buses, for example, $310_{1...M}$ is a master bus or a slave bus. Each of the plurality of on-chip I/O physical buses, for example, $310_{1...M}$ may be independent of each other with regard to the enable and disable control functions of the programmable non-volatile memory 312. Depending on a given system-on-chip configuration, individual customization of the control vector may allow individual I/O control of the plurality of internal on-chip resources, for example, the plurality of sub-blocks $304_{1...n}$.

In accordance with an embodiment of the invention, the security processor 301 may enable authentication of access to the programmable non-volatile memory 312, if a received password matches a generated challenge. The security processor 301 may be enabled to generate the challenge based on decrypting an encrypted key. The security processor 301 may deny access to the programmable non-volatile memory 312, if the received password does not match the generated challenge. The security processor 301 may use secure encryption algorithms, such as RSA or advanced encryption standard (AES).

Figure 4:
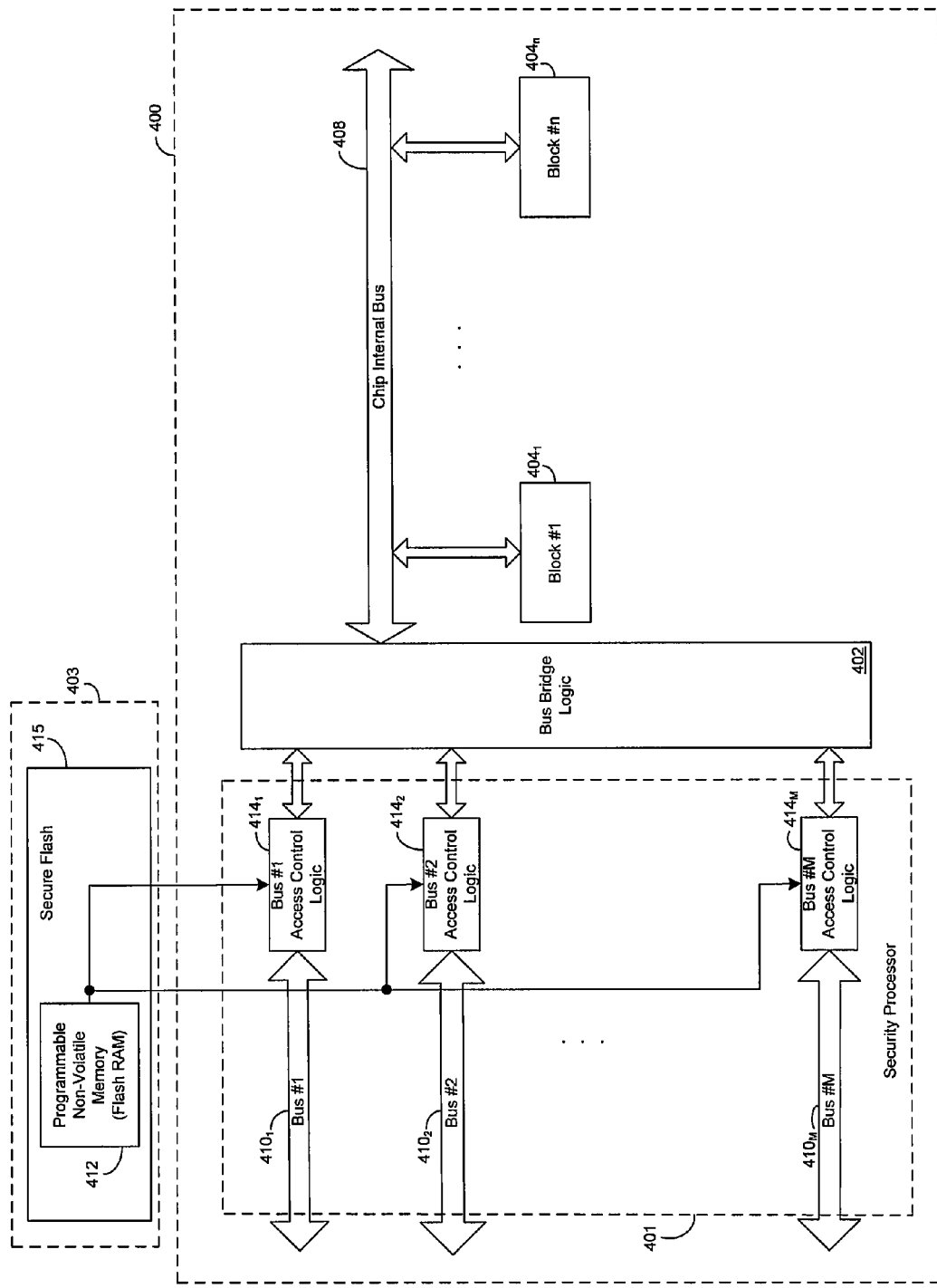
FIG. 4 is a block diagram illustrating exemplary use of externally programmable non-volatile memory to individually control access to internal chip resources, in accordance with an embodiment of the invention.

FIG. 4 is a block diagram illustrating exemplary use of externally programmable non-volatile memory to individually control access to internal chip resources, in accordance with an embodiment of the invention. Referring to FIG. 4, there is shown a chip 400 and an external flash device 403. The chip 400 may comprise a security processor 401, a bus bridge logic block 402, an internal bus 408, a plurality of on-chip sub-blocks $404_{1...n}$, a plurality of physical I/O buses $410_{1...M}$. The security processor 401 may comprise a plurality of bus access control logic blocks $414_{1...M}$. The flash device 403 may comprise a secure programmable non-volatile memory 412 which may be locked and may require a password to access the secure flash 415.

The secure programmable non-volatile memory 412 may store control vectors and/or code that may be enabled to control the internal sub-blocks $404_{1...n}$ of the chip 400 by programming internal control registers and/or observing internal hardware states. These control vectors and code may be encrypted and signed. The secure flash 415 may be enabled to decrypt these control vectors and code and verify their signature and then map at least one bit of a control vector to each of a plurality of on-chip I/O physical buses $410_{1...m}$. The control vector may be a n-bit, for example, 64-bit vector within the programmable non-volatile memory 412. Each physical I/O bus $410_{1...M}$ may be mapped to one or more bits of the control vector stored in the programmable non-volatile memory 412. The programmable non-volatile memory 412 may be enabled to control at least one of the plurality of on-chip I/O physical buses, for example, $410_{1...M}$ by modifying the mapped at least one bit of the control vector via the plurality of bus access control logic blocks $414_1 \ldots _M$. The programmable non-volatile memory 412 may enable and/or disable at least one of the plurality of on-chip I/O physical buses, for example, $410_1 \ldots _M$ by modifying the mapped at least one bit of the control vector.

The plurality of blocks in FIG. 4 may be substantially as described in FIG. 2 and FIG. 3. The secure flash 415 may be enabled to allow and/or deny access to the programmable non-volatile memory 412, if a received password matches a generated challenge. The plurality of security processors, 415 and 401, may utilize encryption algorithms, such as RSA or advanced encryption standard (AES).

In accordance with an embodiment of the invention, a method and system for allowing system-on-chip individual input/output (I/O) control to be disabled and enabled by programmable non-volatile memory may comprise at least one circuit within a security processor 301 comprising a programmable non-volatile memory 312 that enables mapping at least one bit of a control vector stored in the programmable non-volatile memory 312 to each of a plurality of on-chip input/output (I/O) physical buses $310_1 \ldots _M$. At least one circuit, for example, the programmable non-volatile memory 312 may be enabled to control operation of at least one of the plurality of on-chip I/O physical buses, for example, $310_1 \ldots _M$ by modifying the mapped at least one bit of the control vector.

The programmable non-volatile memory 312 may enable at least one of the plurality of on-chip I/O physical buses, for example, $310_1 \ldots _M$ by modifying the mapped at least one bit of the control vector. The programmable non-volatile memory 312 may be utilized to disable at least one of the plurality of on-chip I/O physical buses, for example, $310_1 \ldots _M$ by modifying the mapped at least one bit of the control vector. The non-volatile memory, for example, non-volatile RAM 155 may be within a set-top box 150. The non-volatile memory, for example, programmable non-volatile memory 312 may be a secure flash electrically erasable programmable read only memory (EEPROM) 155. The non-volatile memory, for example, programmable non-volatile memory 412 may be a flash RAM. The security processor 301 may enable authentication of access to the programmable non-volatile memory 312, if a received password matches a generated challenge. The security processor 301 may deny access to the programmable non-volatile memory 312, if the received password does not match the generated challenge.

The security processor 301 may enable encryption of the control vector stored in the programmable non-volatile memory 312. The security processor 301 may enable decryption of the encrypted control vector stored in the programmable non-volatile memory 312 before mapping at least one bit of the control vector stored in the programmable non-volatile memory 312 to each of a plurality of on-chip input/output (I/O) physical buses $310_1 \ldots _M$.

Another embodiment of the invention may provide a machine-readable storage, having stored thereon, a computer program having at least one code section executable by a machine, thereby causing the machine to perform the steps as described above for allowing system-on-chip individual I/O control to be disabled and enabled by programmable non-volatile memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure communication, the method comprising:
    mapping, using a security processor, a first bit of a multibit control vector stored in a non-volatile memory to a first input/output (I/O) physical bus in a plurality of on chip I/O physical buses;
    mapping, using the security processor, a second bit of the multibit control vector to a second I/O physical bus in the plurality of on chip I/O physical buses; and
    controlling operation of the first I/O physical bus and the second I/O physical bus by modifying the mapped first and second bits of the multibit control vector.

2. The method according to claim 1, further comprising enabling the first I/O physical bus by modifying the first bit of the multibit control vector.

3. The method according to claim 1, further comprising disabling the first I/O physical bus by modifying the first bit of the multibit control vector.

4. The method according to claim 1, wherein the non-volatile memory of the security processor is within a set-top box.

5. The method according to claim 1, wherein the non-volatile memory is a secure flash electrically erasable programmable read only memory (EEPROM).

6. The method according to claim 1, wherein the non-volatile memory is a flash Random Access Memory (RAM).

7. The method according to claim 1, further comprising authenticating access to the non-volatile memory in response to determining that a received password matches a generated challenge.

8. The method according to claim 7, further comprising access to the non-volatile memory in response to determining that the received password does not match the generated challenge.

9. The method according to claim 1, further comprising encrypting the multibit control vector stored in the non-volatile memory.

10. A system for secure communication, the system comprising:

a non-volatile memory configured to store a multibit control vector, wherein a first bit of the multibit control vector is mapped to a first input/output (I/O) physical bus in a plurality of I/O physical buses and wherein a second bit of the multibit control vector is mapped to a second I/O physical bus in the plurality of I/O physical buses; and a security processor configured to:
  enable mapping of the first bit and the second bit of the multibit control vector to the first I/O physical bus and the second I/O physical bus, and
  enable controlling the first I/O physical bus and the second I/O physical bus by initiating a modification of the mapped first bit and second bit of the multibit control vector.

11. The system according to claim 10, wherein the security processor is configured to enable the first I/O physical bus by initiating a modification of the mapped first bit of the multibit control vector.

12. The system according to claim 10, wherein the security processor is further configured to disable the first I/O physical bus by initiating a modification of the mapped first bit of the multibit control vector.

13. The system according to claim 10, wherein the non-volatile memory is within a set-top box.

14. The system according to claim 10, wherein the non-volatile memory is a secure flash electrically erasable programmable read only memory (EEPROM).

15. The system according to claim 10, wherein the non-volatile memory is a flash Random Access Memory (RAM).

16. The system according to claim 10, wherein the security processor is further configured to enable authentication of access to the non-volatile memory in response to determining that a received password matches a generated challenge.

17. The system according to claim 16, wherein the security processor is further configured to enable denying of access to the non-volatile memory in response to determining that the received password does not match the generated challenge.

18. The system according to claim 10, wherein the multibit control vector is encrypted.

19. The system according to claim 18, wherein the security processor is further configured to decrypt the mulitbit control vector before enabling the mapping.

20. A set-top box comprising:
a plurality of peripherals;
a plurality of input/output (I/O) physical buses coupled to the plurality of peripherals;
a memory configured to store a multibit control vector, wherein respective bits of the multibit control vector are mapped to corresponding I/O physical buses in the plurality of I/O physical buses; and
a security processor, wherein the security processor is configured to:
  enable a first bus in the plurality of I/O physical buses by:
    initiating a first modification of the mulitbit control vector, and
    initiating a generation of a first control signal, and
  disable the first bus by:
    initiating a second modification of the multibit control vector, and
    initiating a generation of a second control signal.

21. The set-top box of claim 20, wherein the memory is a flash Random Access Memory (RAM).

22. The set-top box of claim 20, wherein the multibit control vector is encrypted.

23. The set-top box of claim 22, wherein the security processor is further configured to:
decrypt the multibit control vector and verify a signature of the decrypted multibit control vector prior to initiating the first modification or the second modification.

24. The set-top box of claim 20, further comprising a chip internal bus configured to couple the plurality of I/O physical buses to the peripherals using a bus bridge.

25. The set-top box of claim 20, wherein the memory is a secure flash electrically erasable programmable read only memory (EEPROM).

26. The set-top box of claim 20, wherein the multibit control vector is a 64-bit control vector.

27. The set-top box of claim 20, wherein the security processor is further configured to:
decrypt a key;
generate a challenge based on the key;
receive a password;
enable access to the memory in response to determining that the password corresponds to the challenge.

28. The set-top box of claim 26, wherein the security processor is further configured to:
deny access to the memory in response to determining that a password does not correspond to a challenge.

29. The set-top box of claim 26, wherein a key corresponds to a device ID uniquely identifying the set-top box.

30. The set-top box of claim 20, wherein each bit of the multibit control vector is mapped to a respective I/O physical bus in the plurality of I/O physical buses.

* * * * *

UNITED STATES PATENT AND TRADEMARK OFFICE
CERTIFICATE OF CORRECTION

PATENT NO.         : 8,844,022 B2                                    Page 1 of 1
APPLICATION NO.    : 11/558328
DATED              : September 23, 2014
INVENTOR(S)        : Chen et al.

It is certified that error appears in the above-identified patent and that said Letters Patent is hereby corrected as shown below:

On the title page, in the priority data item (60), replace "60/814,814" with --60/814,834--.

In the Claims

In column 9, line 42, claim 19, replace "mulitbit" with --multibit--.

In column 10, line 8, claim 20, replace "mulitbit" with --multibit--.

Signed and Sealed this
Fifth Day of May, 2015

Michelle K. Lee
*Director of the United States Patent and Trademark Office*